US012694355B2

(12) United States Patent
Weyßer et al.

(10) Patent No.: US 12,694,355 B2
(45) Date of Patent: Jul. 28, 2026

(54) PREDICTION OF RESIDUES OF PLANT PROTECTION AGENTS IN HARVESTED PRODUCTS

(71) Applicant: BAYER AKTIENGESELLSCHAFT, Leverkusen (DE)

(72) Inventors: Fabian Weyßer, Leverkusen (DE); Georg Mogk, Kürten (DE); Florian Mrugalla, Leverkussen (DE)

(73) Assignee: BAYER CROPSCIENCE SCHWEIZ AG, Basel (CH)

( * ) Notice: Subject to any disclaimer, the term of this patent is extended or adjusted under 35 U.S.C. 154(b) by 200 days.

(21) Appl. No.: 18/274,951

(22) PCT Filed: Jan. 24, 2022

(86) PCT No.: PCT/EP2022/051441
§ 371 (c)(1),
(2) Date: Jul. 28, 2023

(87) PCT Pub. No.: WO2022/167240
PCT Pub. Date: Aug. 11, 2022

(65) Prior Publication Data
US 2024/0095639 A1      Mar. 21, 2024

(30) Foreign Application Priority Data
Feb. 3, 2021     (EP) ..................................... 21154918

(51) Int. Cl.
*G06Q 10/00*      (2026.01)
*A01G 13/00*      (2006.01)
(Continued)

(52) U.S. Cl.
CPC ......... *G06Q 10/0637* (2013.01); *A01G 13/00* (2013.01); *G06Q 50/02* (2013.01)

(58) Field of Classification Search
None
See application file for complete search history.

(56) References Cited

U.S. PATENT DOCUMENTS 6,653,971 B1 * 11/2003 Guice ..................... G01S 13/88
                                                    342/28
7,058,197 B1 * 6/2006 McGuire ................... G06T 7/11
                                                    382/108
(Continued)

FOREIGN PATENT DOCUMENTS

CN        112150300 A      12/2020
EP         3346822 A1       7/2018
(Continued)

OTHER PUBLICATIONS

M Haase, C Rösch, D Ketzer et al. (GIS-based assessment of sustainable crop residue potentials in European regions)—Biomass and Bioenergy, 2016—Elsevier (hereinafter Ketzer et al.) in view (Year: 2016).*

(Continued)

*Primary Examiner* — Hafiz A Kassim
(74) *Attorney, Agent, or Firm* — Harness, Dickey & Pierce, P.L.C.

(57) ABSTRACT

The present invention relates to the prediction of residues of plant protection agents in plants or plant parts which are intended for human or animal consumption, preferably in vegetables and/or fruit. The present invention also relates to a method, a device, a system and a computer program product for predicting residues of plant protection agents.

14 Claims, 10 Drawing Sheets

(51) Int. Cl.
    *G06Q 10/0637*         (2023.01)
    *G06Q 50/02*          (2012.01)

(56)              References Cited

U.S. PATENT DOCUMENTS

| | | | |
|---|---|---|---|
| 2009/0007485 A1* | 1/2009 | Holland | A01C 21/007 |
| | | | 47/58.1 R |
| 2015/0119239 A1* | 4/2015 | Gewehr | A01N 43/40 |
| | | | 504/225 |
| 2016/0232621 A1* | 8/2016 | Ethington | A01B 79/02 |
| 2016/0275580 A1* | 9/2016 | Uechi | G06Q 10/06315 |
| 2018/0289008 A1* | 10/2018 | Sebastian | A01N 43/68 |
| 2018/0315056 A1* | 11/2018 | Klavins | G06Q 50/02 |
| 2019/0392269 A1* | 12/2019 | Ferrari | G06V 30/19173 |
| 2020/0257997 A1* | 8/2020 | Mewes | A01G 22/00 |
| 2021/0010993 A1* | 1/2021 | Shibata | G01N 33/24 |
| 2022/0110248 A1* | 4/2022 | Vandike | G01N 33/0098 |
| 2022/0183267 A1* | 6/2022 | Janssen | A01M 7/0089 |

FOREIGN PATENT DOCUMENTS

| | | |
|---|---|---|
| WO | WO-2018050580 A1 | 3/2018 |
| WO | WO-2020137085 A1 | 7/2020 |

OTHER PUBLICATIONS

Sabine Beulke, Colin D. Brown et al. (Evaluation of methods to derive pesticide degradation parameters for regulatory modelling)—Springer-Verlag 2001 (hereinafter Brown et al.). (Year: 2001).*

L Han, G Yang, H Dai, B Xu, H Yang, H Feng, Z Li (Modeling maize above-ground biomass based on machine learning approaches using UAV remote-sensing data) . . . —Plant methods, 2019—Springer (Year: 2019).*

KG Liakos, P Busato, D Moshou, S Pearson, D Bochtis (Machine learning in agriculture: A review)—Sensors, 2018—mdpi.com (Year: 2018).*

* cited by examiner

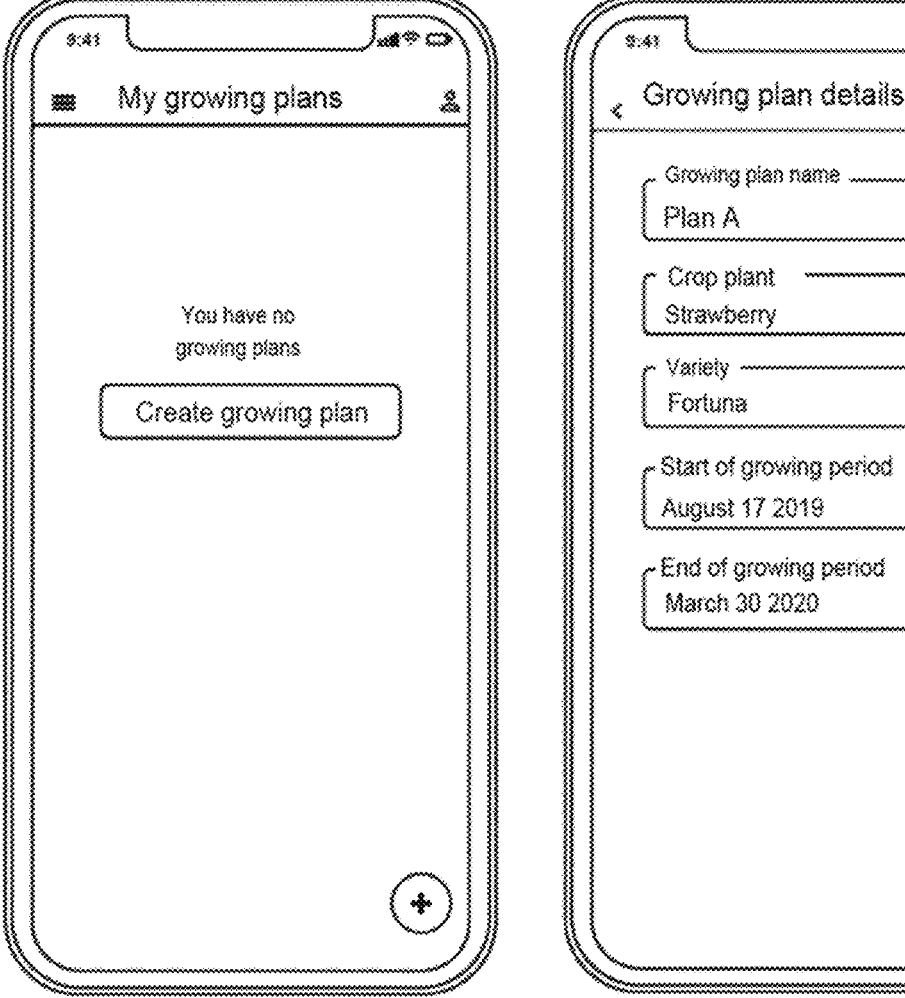
Fig. 15                      Fig. 16

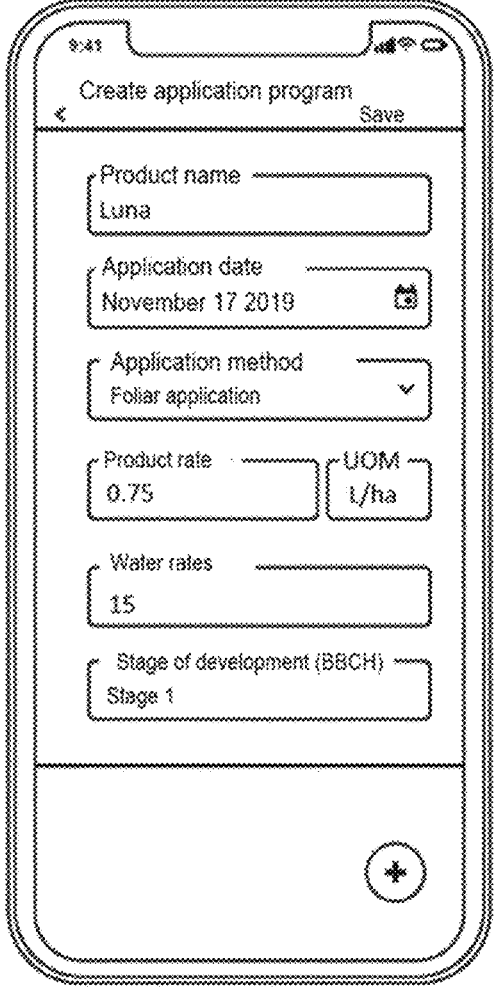

Create application program

Save

Product name

Luna

Application date

November 17 2019

Application method

Foliar application

Product rate     UOM 0.75          L/ha

Water rates

15

Stage of development (BBCH)

Stage 1

Plan A

Strawberry
Fortuna

Residue prediction on November 12 2019

✕      MRL details

| 2 | 0 | 0 |
|---|---|---|
| failed | at risk | passed |

Fluopyram
Predicted value      0.82 mg/kg
Target MRL         0.67 mg/kg
                   +0.15 mg/kg Trifloxystrobin
Predicted value      0.82 mg/kg
Target MRL         0.50 mg/kg
                   +0.32 mg/kg Application program ✎

Prod. A May 10 2019 0.5 L/ha 20 L/ha Stage 2

Prod. A July 10 2019 0.5 L/ha 20 L/ha Stage 3

Fields ✎

Field A     Field A

Fig. 20

PREDICTION OF RESIDUES OF PLANT PROTECTION AGENTS IN HARVESTED PRODUCTS

CROSS-REFERENCE TO RELATED APPLICATIONS

This application is a U.S. national stage filing under 35 U.S.C. § 371 of International Application No. PCT/EP2022/051441, filed on Jan. 24, 2022, which claims the benefit of, and priority to, European Patent Application No. 21154918.3, filed on Feb. 3, 2021. The entire disclosure of each of the above applications is incorporated herein by reference.

The present invention is concerned with the predicting of crop protection product residues in plants or parts of plants that are intended for human and/or animal consumption, preferably in fruit and/or vegetables. The present invention provides a method, a device, a system and a computer program product for prediction of crop protection product residues.

Crop protection product residues are residues of active ingredients (e.g. insecticides, fungicides, herbicides or other pesticides) that served for crop protection, i.e. were used during the production of plants, and are detectable in the end products.

The use of crop protection products is legally regulated in many countries and is intended to rule out endangerment of animal and human health by crop protection products. Specific application regulations (wait times or time intervals between the last application and harvest, amount to be applied, application limits) take account of the physical properties and hence influence the development and extent of residues.

Many countries prohibit trade in foods containing crop protection products that exceed certain upper limits fixed for the individual substances.

The upper residue limits for crop protection products in conventional foods and animal feeds have been harmonized in all European member states since 1 Sep. 2008 by the entry into force of Directive (EC) No. 396/2005. However, there are no globally uniform limits.

Some store chains (traders) require their producers to produce plant-based foods with crop protection product residues (well) below the legal stipulations. There can be some variation between the demands from different store chains.

Crop protection product residues can, for example, be determined and quantified in laboratories. There are numerous service providers that determine crop protection product residues to order in foods and animal feeds.

For a producer of plant-based foods and animal feeds, it would be advantageous even during the growing of the plants to obtain information as to what amounts of crop protection product residues are to be expected in the harvested products if the producer uses a defined crop protection product according to a defined application program. The producer would then be able, through changes in the crop protection product and/or in the application program, to control the amount of residue of the crop protection product in the harvested product to a certain degree. Moreover, it would be advantageous for such a producer to know which residue values are acceptable to which store chains to buy the producer's products and sell them on to end customers.

This object is achieved by the subjects of the independent claims. Preferred embodiments can be found in the dependent claims, the drawings and the present description.

The present invention firstly provides a device comprising
an input unit
a control and calculation unit and
an output unit,
wherein the control and calculation unit is configured to trigger the input unit to receive and/or ascertain the following input information:
crop plant being grown,
crop protection product used,
number of applications of the crop protection product and amounts applied each time,
periods of time between the application(s) and harvesting time,
information relating to the biomass of the crop plant that was present on each application of the crop protection product,
environmental conditions during the growing of the crop plant, especially on and/or after the application(s) of the crop protection product,
wherein the control and calculation unit is configured to calculate an amount of a residue of the crop protection product in and/or on the parts of the crop plant intended for human and/or animal consumption at the harvesting time of the crop plant, using the input information,
wherein the calculation and control unit is configured to trigger the output unit to output information relating to the amount of residue.

The present invention further provides a computer-implemented method comprising the steps of:
receiving and/or ascertaining input information by means of a computer system, wherein the input information includes:
crop plant being grown,
crop protection product used,
number of applications of the crop protection product and amounts applied each time,
periods of time between the application(s) and harvesting time,
information relating to the biomass of the crop plant that was present on each application of the crop protection product,
environmental conditions during the growing of the crop plant, especially on and/or after the application(s) of the crop protection product,
calculating an amount of a residue of the crop protection product in and/or on the parts of the crop plant intended for human and/or animal consumption, preferably at the time of harvesting, by means of the computer system,
outputting information relating to the amount of residue via an output unit of the computer system.

The present invention further provides a system comprising
a first computer system comprising an input unit, a first control and calculation unit, a first transmitter and receiver unit and an output unit,
a second computer system comprising a second control and calculation unit and a second transmitter and receiver unit,
wherein the first control and calculation unit is configured to trigger the input unit to receive and/or ascertain the following input information:
crop plant being grown,
crop protection product used,
number of applications of the crop protection product and amounts applied each time, periods of time between the application(s) and harvesting time, optionally: information relating to the biomass of the crop plant that was present on each application of the crop protection product, optionally: environmental conditions during the growing of the crop plant, especially on and/or after the application(s) of the crop protection product, wherein the first control and calculation unit is configured to trigger the first transmitter and receiver unit to transmit the input information via a network to the second computer system, wherein the second control and calculation unit is configured to trigger the second transmitter and receiver unit to receive the input information via the network, wherein the second control and calculation unit is configured to ascertain the following information if the information has not already been transmitted by the first computer system:

information relating to the biomass of the crop plant that was present on each application of the crop protection product and/or environmental conditions during the growing of the crop plant, especially on and/or after the application(s) of the crop protection product, wherein the second control and calculation unit is configured to calculate an amount of a residue of the crop protection product in and/or on the parts of the crop plant intended for human and/or animal consumption, preferably at the time of harvesting, on the basis of the input information, wherein the second control and calculation unit is configured to trigger the second transmitter and receiver unit to transmit the amount of the residue via the network to the first computer system, wherein the first control and calculation unit is configured to trigger the first transmitter and receiver unit to receive the amount of the residue via the network, wherein the first control and calculation unit is configured to trigger the output unit to output information relating to the amount of the residue to a user.

The present invention further provides a computer program product comprising a data carrier and program code which is stored on the data carrier and which triggers a computer system, in the memory of which the program code has been loaded, to execute the following steps:

receiving and/or transmitting the following input information:

crop plant being grown, crop protection product used, number of applications of the crop protection product and amounts applied each time, periods of time between the application(s) and harvesting time, information relating to the biomass of the crop plant that was present on each application of the crop protection product, environmental conditions during the growing of the crop plant, especially on and/or after the application(s) of the crop protection product, calculating an amount of a residue of the crop protection product in and/or on the parts of the crop plant intended for human and/or animal consumption, preferably at the time of harvesting of the crop plant, using the input information, outputting information relating to the amount of residue.

The invention will be more particularly elucidated hereinafter without distinguishing between the subjects of the invention (method, device, system, computer program product). Instead, the elucidations that follow are intended to apply analogously to all the subjects of the invention, irrespective of the context (method, device, system, computer program product) in which they occur.

If steps are stated in an order in the present description or in the claims, this does not necessarily mean that the invention is restricted to the stated order. Instead, it is conceivable that the steps can also be executed in a different order or else in parallel to one another, unless one step builds upon another step, which necessarily means that the step building upon the other is executed subsequently (but this will be clear in the individual case). The stated orders are thus preferred embodiments.

The present invention is executed with the aid of one or more computer systems.

A "computer system" is a system for electronic data processing that processes data by means of programmable computation rules. Such a system typically comprises a "computer", i.e. unit comprising a processor for the execution of logic operations, and also peripherals.

In computer technology, "peripherals" refers to all devices that are connected to the computer and are used for control of the computer and/or as input and output devices. Examples thereof are monitor (display), printer, scanner, mouse, keyboard, drives, camera, microphone, speakers, etc. Internal ports and expansion cards are also regarded as peripherals in computer technology.

Modern computer systems are frequently divided into desktop PCs, portable PCs, laptops, notebooks, netbooks and tablet PCs, and what are called handhelds (e.g. smartphones); all these devices can be utilized for execution of the invention.

Inputs into the computer are achieved via input means such as, for example, a keyboard, a mouse, a microphone, a network connection, an external data memory and/or the like. "Input" is also to be understood as meaning the selection of an entry from a virtual menu or from a virtual list or clicking on a checkbox and the like by the user of the computer system according to the invention. Outputs are usually achieved via a screen (monitor), on a printer, via loudspeakers and/or by storage on a data memory.

The device of the invention may be executed in the form of such a computer system. In addition, the system of the invention may comprise two or more computer systems of this kind.

The present invention serves to predict the amount of residue of a crop protection product in and/or on the parts of a crop plant intended for human and/or animal consumption, preferably at the time of harvesting.

The prediction is made for a specific crop plant. The term "crop plant" is understood to mean a plant which is specifically grown as a useful plant by human intervention. For example, parts of the crop plant being grown may be suitable for human and/or animal consumption. In a preferred embodiment, the crop plant is a fruit plant or a vegetable plant.

The crop plant is preferably one of the plants listed in the following encyclopaedia: Christopher Cumo: *Encyclopedia of Cultivated Plants: From Acacia to Zinnia*, volumes 1 to 3, ABC-CLIO, 2013, ISBN 9781598847758.

The crop plant is more preferably selected from the following list: strawberry, tomato, cucumber, bell pepper, radish, kohlrabi, carrot, celery, fennel, parsnip, peas, beans, asparagus, spinach, chard, artichoke, black salsify, butterhead lettuce, crisphead lettuce, leaf lettuce, endive, chicory, aubergine, pumpkin, courgette, lamb's lettuce, sugarbeet, rhubarb, white cabbage, red cabbage, kale, Brussels sprouts, cauliflower, broccoli, raspberry, blackberry, blueberry, elderberry, cherry, apple, pear, grape, plum, mirabelle plum, peach, apricot, melon, gooseberry.

The prediction is made on the basis of information that (further) specifies the crop plant, the crop protection product and growing conditions. These pieces of information are also referred to as "input information" in this description. The term "input information" shall not be understood here to mean that this information is all input into the computer system of the invention by a user. Instead, some of the input information may also be ascertained by the computer system of the invention (on the basis of input information) (as elucidated in detail hereinafter). In this respect, the basis of the term "input" is more that the input information is included as input in the calculation of an amount of a residue of a crop protection product.

Also used in the present description is the term "specifying". According to the manner in which an article is "specified", the term "specifying" can have the meanings of "inputting", "ascertaining", "selecting", "preselecting", "calculating" and/or "deriving".

In a first step, the crop plant is specified. This is preferably effected in that a user inputs the name of the crop plant or the name of the variety of the crop plant or a code for the crop plant/crop plant variety (for example according to the International Code of Nomenclature for Cultivated Plants, ICNCP for short) into the computer system according to the invention, or selects the corresponding information relating to the crop plant from a list or menu, or selects a crop plant from a pictorial illustration of the crop plant (for example a photograph or a graphic).

It is also conceivable that the crop plant, or the vessel in which the crop plant is present, or a bed in which the crop plant is being grown, or a catalogue in which the crop plant is listed, or a package for the crop plant or for seed for growing of the crop plant, has been provided with a machine-readable code that provides information relating to the crop plant. In such a case, the specification of the crop plant may involve reading of the machine-readable code with a suitable reading device and transmission of the information relating to the crop plant that has been read by means of the reading device to the computer system of the invention. Such a machine-readable code may, for example, be an optoelectronically readable code (e.g. barcode, 2D code (e.g. DataMatrix or QR code)) or a code stored electronically in a semiconductor memory (e.g. an RFID chip).

It is also conceivable that the computer program product of the invention is intended solely for a single crop plant, i.e. can only calculate/predict the amount of a residue of a crop protection product for a single crop plant or crop plant variety. In such a case, the step of "specifying a crop plant" involves a user selecting the corresponding computer program product to calculate the amount of residue of one or more crop protection products in the crop plant for which the computer program is intended.

In a further step, information relating to the growing of the crop plant (also referred to in this description as growing parameters or growing conditions) may be specified.

The growing parameters may specify where and/or under what conditions the crop plant is being grown. It is possible to specify, for example, whether the crop plant is being grown outdoors, in a film tunnel (as is common practice for strawberries for example), in a greenhouse or the like. By virtue of the substantial lack of weather effects (e.g. rain), amounts of residue in plants that are cultivated in a greenhouse may be higher than in the case of cultivation outdoors.

It is possible to specify whether artificial irrigation is being effected; if appropriate, the irrigation volumes may be specified.

Especially where a greenhouse is involved, the user is preferably able to specify the conditions that exist in the greenhouse, for example the temperature (air, soil), humidity (air, soil) and carbon dioxide content in the air, for example in the form of a progression overtime during the day/night, maximum value, minimum value, mean value (e.g. arithmetic mean (average)), variance, cumulative temperatures, cumulative radiations and/or the like.

The abovementioned conditions (temperature, humidity, carbon dioxide content, amounts of radiation) can of course also be specified for crop plants that are being grown outdoors or in a film tunnel. These conditions are also referred to as "environmental conditions" in this description. The weather conditions during the vegetation period of the crop plant are preferably recorded. It is possible here to detect the following values: air temperature, air humidity, air pressure, wind speed, type of precipitation, amount of precipitation, insolation and/or the like. It is possible here, for example, to detect daily maximum, daily minimum and/or daily mean values (e.g. arithmetic means). The weather conditions may on the one hand have an effect on the degradation characteristics of an active ingredient, and on the other hand determine the growth characteristics of the crop plants (the biomass at the time of application of a crop protection product).

The geographic position of the field in which the crop plant is being grown is preferably specified. Using the geographic position of the field, it is then possible to read out values for the environmental conditions mentioned that existed during the growth period (current measured and/or forecast values) or typically exist (historical mean values), for example from databases. However, it is also conceivable that merely a geographic position of a field is specified and used in a machine learning model to learn a relationship between the geographic position and the amount of residue calculated.

The term "field" is understood to mean a spatially delimitable region of the surface of the earth under agricultural cultivation, in that such a field is planted with crop plants that are supplied with nutrients and harvested.

The specification of the geographic position of a field may involve, for example, specifying that country in which the field is located. It is also conceivable that a region in which the field is located is specified. Such a region may, for example, be a region with a defined climate that differs from the climate of adjacent regions. A region may be a growing area for a specific crop plant (for definition of a growing area see, for example, Journal für Kulturpflanzen, 61 (7), p. 247-253, 2009, ISSN 0027-7479). A region may also be a biome (for definition of equivalent German term Boden-Klima-Raum see, for example, Nachrichtenbl. Deut. Pflanzenschutzd., 59(7), p. 155-161, 2007, ISSN 0027-7479).

The specification of the geographic position of a field may also involve giving the geographic coordinates (geocoordinates) of at least one point that lies within the field or lies at the edge of the field. Many fields have the shape of a polygon. For such a field, specification may comprise giving the geocoordinates of the vertices of the polygon. It is conceivable that a user, for specification of the geographic position of a field, will draw the field boundaries on a virtual map which is displayed on a display of the computer system of the invention using a finger or an input device (for example with a mouse).

It is conceivable that information relating to growing (e.g. typical growth conditions) for one or more crop plants is already recorded on a data medium. It is conceivable that the device of the invention or system of the invention, after the specifying of a crop plant, reads the customary growth conditions for the crop plant from the data medium and uses the values read as the basis for further calculation of the amount of residue. It is also conceivable that the growth conditions are set by specifying the position; for defined countries and/or regions, it is possible to store customary growth conditions on the data medium that can be made the basis for further calculation. It is also conceivable that the computer program product of the invention is intended only for a single crop plant which is grown under defined growth conditions. In such a case, the step of "specifying the growth conditions" involves a user selecting the corresponding computer program product.

It is conceivable that the computer system is configured, with knowledge of the geographic position of the field in which the crop plant is being grown, to find information relating to the climate and/or weather in the region in which the field is located from a database, for example via a network. This information relating to the climate and/or weather can then be used to ascertain the amount of residue and/or for the growth of the crop plant.

In a next step, at least one crop protection product which is being used, i.e. applied, in the course of growth of the specified crop plant is specified.

The term "crop protection product" is understood to mean a product that serves to protect plants or plant products from harmful organisms or prevent the effect thereof, to destroy unwanted plants or parts of plants, to inhibit unwanted growth of plants or prevent such growth, and/or to influence the life processes of plants as nutrients in some other way (e.g. growth regulators). Said growth regulators serve, for example, to increase stability in cereals by shortening culm length (culm shorteners or, better, internode shorteners), improve the root development of seedlings, reduce the plant height by stunting in horticulture, or prevent the germination of potatoes. Growth regulators are typically phytohormones or their synthetic analogues. Examples of further crop protection products are herbicides, fungicides and other pesticides (e.g. insecticides, nematicides, molluscicides and the like).

A crop protection product typically comprises one or more active ingredients. "Active ingredients" refer to substances that have a specific effect in an organism and cause a specific reaction. An active ingredient may be a synthetically prepared (chemical) active ingredient or a (biological) active ingredient obtained from an organism. Combinations are also conceivable. A crop protection product typically comprises a carrier for dilution of the one or more active ingredients. In addition, additives are conceivable, such as preservatives, buffers, dyes and the like. A crop protection product may be in solid, liquid or gaseous form.

A "harmful organism" is understood to mean an organism that can appear in the course of growing crop plants and damage the crop plant, adversely affect the harvest of the crop plant or compete for natural resources with the crop plant. Examples of such harmful organisms are broadleaved weeds, weed grasses, animal pests, for example beetles, caterpillars and worms, fungi and pathogens (e.g. bacteria and viruses). Even though viruses are not organisms from a biological point of view, they shall nevertheless be covered by the term "harmful organism" in this description.

The term "broadleaved weed" (plural term: broadleaved weeds) is understood to mean spontaneously accompanying vegetation plants in crops of crop plants, grassland or gardens that are not being specifically grown there and develop, for example, from the seed potential of the soil or are blown in. The term is not limited to broadleaved plants in the actual sense, but also includes grasses, ferns, mosses or woody plants. In the field of crop protection, the term "weed grass" (plural term: weed grasses) is frequently also utilized in order to illustrate a delimitation from the broad-leaved plants. In the present text, the term "broadleaved weed" is used as an umbrella term that is to include weed grass, unless reference is being made to specific broadleaved weeds or weed grasses.

The term "control" is understood to mean prevention of infestation of a field/a crop plant or a portion thereof with one or more harmful organisms and/or prevention of the spread of one or more harmful organisms and/or reduction in the amount of harmful organisms present.

The specification of a crop protection product is important for two reasons: Firstly, the specification of the crop protection product also specifies the substance(s) for which the amount(s) of residue is/are to be predicted in accordance with the invention. The substance for which an amount of residue is to be predicted is typically the active ingredient in the crop protection product and/or a degradation product of the active ingredient that can (likewise) exert a biological effect in an organism. Secondly, degradation characteristics (and hence also the amount of residue) are determined to a crucial degree by the chemical structure of the active ingredient and, if appropriate, the formulation thereof in the crop protection product. For many active ingredients, there are available models for degradation characteristics (see, for example, Environ. Sci. Technol. 2019, 53, 5838-5847; Soulas, G. & Lagacherie, B. Biol Fertil Soils (2001) 33: 551. https://doi.org/10.1007/s003740100363; Beulke, S. & Brown, C. D. Biol Fertil Soils (2001) 33: 558. https://doi.org/10.1007/s003740100364; Pagel, Holge, et al., Biogeochemistry, vol. 117, 2014, pp. 185-204., www.jstor.org/stable/24716853; https://www.epa.gov/pesticide-science-and-assessing-pesticide-risks/guidance-calculate-representative-half-life-values).

There is often exponential degradation; this means that the amount of active ingredient deployed decreases exponentially with time. In addition, the physicochemical properties of the active ingredient determine the extent to which the active ingredient is transported via the distribution pathways of the plants into edible components.

A crop protection product can be specified, for example, on the basis of the product name of the crop protection product or another name or the chemical formula for an active ingredient present in the crop protection product.

It is also conceivable that a crop protection product is selected from a list using a name and/or a pictorial representation (e.g. a photograph of the product).

It is also conceivable that the packaging of the crop protection product includes a machine-readable code that provides information relating to the crop protection product and that can be read out by a suitable reading device. The machine-readable code may, as already described above, be an optoelectronically readable code and/or a code stored electronically in a semiconductor memory (for example of an RFID tag).

It is conceivable that multiple crop protection products that are/are to be applied simultaneously or at different times are specified.

It is also conceivable that the computer program product of the invention is intended solely for a single crop protection product, i.e. can only calculate/predict the amount of a residue of a specific crop protection product. In such a case, the step of "specifying a crop protection product" involves a user selecting the corresponding computer program product to calculate amounts of residue of that crop protection product in a crop plant for which the computer program is intended.

Preferably, the device of the invention and the system of the invention are configured such that they make a preselection in respect of the at least one crop protection product on the basis of the information relating to the crop plant being grown and/or on the basis of the information relating to the geographic position of the field and/or on the basis of the growing conditions. The term "preselection" in connection with a crop protection product means that the device/system selects from a list of crop protection products, and displays to the user, those crop protection products that are typically used for the crop plant specified and/or are typically used for control of harmful organisms that can occur in the case of the crop plant specified, and/or selects those crop protection products that are effective against harmful organisms that can appear under the conditions that exist at the geographic position of the specified field or in the greenhouse. A user is then able to select one (or more) from the preselected crop protection products for which a calculation of the amount of residue is to be made. It is also conceivable that the preselection finds only one suitable crop protection product, which can then be displayed to the user.

According to the geographic position that has been specified for the field, the list of preselected crop protection products may vary. The device of the invention and the system of the invention are preferably configured such that they preselect and display only those crop protection products that have been officially approved for deployment in the country in which the respective field is located. Corresponding information relating to official approvals may be stored in one or more databases, to which the computer system according to the invention may have access, for example, via a network connection.

In a further step, the application of the crop protection product can preferably be specified (in detail) using application parameters. The application parameters include, for example, the type of treatment, the application rate and at least one juncture or at least one period of time at which/in which the crop protection product is and/or was (to be) applied in the amount specified. The earlier a treatment is effected in the vegetation period of the crop plant, the smaller the amount of residues typically is.

It is conceivable here that crop protection product is applied repeatedly over a vegetation period (at different junctures or in different periods of time). In the case of multiple application, it is possible to specify the number of applications and the time interval between the applications. The application rates may be the same or may vary in the case of multiple deployment. There may also be variation in the nature of treatment and/or the crop protection product used in each case. A factor of major importance is the period of time between the last application of a crop protection product and harvest; in general, crop protection product residues are degraded over time; i.e., the longer ago the juncture of the application, the smaller the amount of residue.

Preference is given to specifying the number of applications of the crop protection product and the amount applied each time. Preference is given to specifying the periods of time between the application(s) and harvesting time.

The amount applied each time can be reported, for example, in the form of the application rate.

The "application rate" is the amount of a crop protection product needed for control of harmful organisms, which is typically reported per unit area (on deployment to the field), per unit space (for example in a greenhouse) or per unit of amount of seed (for example in the case of seed dressing). The amount can be reported in the form of weight (e.g. kg) or in the form of volume (e.g. 1). The amounts may be based on the total amount of the crop protection product or on the active ingredient present in the crop protection product. It tends to be the case that the greater the amount of active ingredient deployed to an area, the higher the amount of residue in/on the harvested material.

If water is used for dilution of a crop protection product, it is also possible to specify the amount of water used.

It is conceivable that the manner of treatment of the crop plant with the crop protection product is specified. In the specification of the type of treatment, for example, it is possible to state whether the treatment is of the seed or of the plant at a defined stage of development. Treatments directly on the harvested material normally lead to higher amounts of residue than, for example, seed treatments prior to sowing. In addition, it is possible to state which parts of the plant are treated (for example leaves, fruits and/or roots) or whether soil treatment takes place.

The application parameters can be input by a user into the device of the invention or the system of the invention. In addition, the application parameters may be wholly or partly ascertained by the device of the invention or the system of the invention using the information already input in relation to the crop plant, to the geographic position of the field, to the growth conditions and/or to the crop protection product.

It is conceivable, for example, that information has been provided for a crop protection product by the manufacturer or distributor of the crop protection product as to when and in what amounts the crop protection product should be applied. This information may be stored in an internal or external data medium that can be accessed by the device of the invention/the system of the invention. The device/system may thus be configured to generate a suggestion on the basis of the information available as to when the crop protection product should be applied and in what amounts. The user is then able to accept or amend this suggestion. The accepted and/or amended data can then be used to calculate the amount of residue.

Junctures/periods of time at which/in which crop protection products are applied may, for example, (also) be guided by the stage of development of the crop plant. The stage of development of a plant may be stated, for example, in the form of what is called the BBCH code. The BBCH abbreviation denotes the Biologische Bundesanstalt, Bundessortenamt and CHemische Industrie [Federal Biological Institute for Agriculture and Forestry, Federal Office for Crop Plant Varieties, Chemical Industry]. The extended BBCH scale for uniform coding of the phenological stages of growth of mono- and dicotyledonous plants is a partnership between the Biologische Bundesanstalt für Land-und Forstwirtschaft (BBA), the Bundessortenamt (BSA), the Industrieverband Agrar (IVA) [Agrochemical Industry Association] and the Institute of Vegetable and Ornamental Crops in Grossbeeren, Erfurt. It is conceivable that a user inputs the (extended) BBCH code for the crop plant being grown into the device/system. It is additionally conceivable that the device/system is configured to calculate the BBCH code itself. It is conceivable, for example, that the user has input the time of planting/sowing of the crop plant into the device/system, and the device/system calculates the BBCH code using the time of planting/sowing.

Further information included in the calculation of the amount of residue is preferably information relating to the biomass of the crop plant that was present on each application of the crop protection product. If a defined application rate of a crop protection product is applied, it is ideally divided uniformly over the available biomass. In other words, the more biomass there is for a defined application rate, the smaller the proportion of the crop protection product per kilogram of crop plant (in the form of fruits and/or leaves and/or other plant constituents). For the calculation of the amount of residue, the aim is thus to ascertain an amount of crop plants present over which a specified amount of crop protection product is divided.

The information relating to the biomass of the crop plant that was present on each application may be a statement as to the actual mass of the crop plant present—but it may also be a piece of information that correlates with the biomass, for example the height of the crop plant at the time of an application, the extent of the crop plant parallel to the ground, the size of plant parts, for example of leaves and/or fruits, fruit mass, the diameter of fruits and/or the like. The information relating to the biomass is preferably average values, i.e. the arithmetic means over a crop of plants in an area of a field or part of an area of a field.

In a preferred embodiment, the information relating to the biomass of the crop plant is the average height of the crop plants in a crop of plants. In a further preferred embodiment, the information relating to biomass of the crop plant is the average diameter and/or volume of fruits in a crop of plants. In a further preferred embodiment, the information relating to the biomass of the crop plant is the proportion of plants which, viewed from above (in the direction of the centre of the Earth), covers the soil (for example a field area). In a further preferred embodiment, the information relating to the biomass of the crop plant is the mean size of the area of the leaves of a crop of plants. In a further preferred embodiment, the information relating to the biomass of the crop plant is a vegetation index, for example the normalized difference vegetation index or else normalized density vegetation index (NDVI). It is also conceivable that the information relating to the biomass of the crop plant is a combination of the parameters mentioned and/or others.

It is also conceivable that the information relating to the biomass of the crop plant is specified with reference to the stage of development of the crop plant. The stage of development may, for example, be specified by a user or calculated by the device according to the invention/the computer system according to the invention, for example with the aid of a plant growth model. It is further conceivable that the information relating to the biomass of the crop plant is calculated directly with the aid of a plant growth model.

Such a plant growth model may, for example, be a mathematical model that describes the growth of a plant depending on intrinsic (genetic) and/or extrinsic (environmental) factors. An overview of the creation of plant growth models is given, for example, by the textbooks i) "*Mathematische Modellbildung und Simulation*" [Mathematical Model Formation and Simulation] by Marco Günther and Kai Velten, published by Wiley-VCH Verlag in October 2014 (ISBN: 978-3-527-41217-4), and ii) "*Working with Dynamic Crop Models*" by Daniel Wallach, David Makowski, James W. Jones and Francois Brun, published in 2014 in Academic Press (Elsevier), USA.

Plant growth models exist for a multitude of crop plants. The plant growth model typically simulates the growth of a crop of crop plants over a defined period of time. It is also conceivable to use a model based on a single plant that simulates the flows of energy and matter in the individual organs of the plant. Mixed models are additionally usable.

The growth of a crop plant is determined not only by the genetic features of the plant but primarily also by the local weather conditions that exist over the lifetime of the plant (quantity and spectral distribution of the incident solar radiation, temperature profiles, amounts of precipitation, wind input), the condition of the soil and the nutrient supply.

Cultivation measures that have already been undertaken (in the past) and any infestation with harmful organisms that has occurred can also influence crop growth and can be taken into account in the growth model.

The plant growth models are generally what are called dynamic process-based models (see "*Working with Dynamic Crop Models*" by Daniel Wallach, David Makowski, James W. Jones and Francois Brun, published in 2014 in Academic Press (Elsevier), USA), but may also be entirely or partly rule-based or statistical or data-assisted/empirical. The models are generally what are called point models. The models here are generally calibrated such that the output reflects the three-dimensional representation of the input. If the input is ascertained at a point in space or is interpolated or estimated for a point in space, it is generally assumed that the model output is applicable to the entire adjoining field. An application of so-called point models calibrated to the field level to further, generally larger scales is known (see, for example: H. Hoffmann et al.: Impact of spatial soil and climate input data aggregation on regional yield simulations. PLoS ONE 11(4): e0151782. doi:10.1371/journal.pone.0151782). Application of this so-called point model to multiple points within a field enables part-area-specific modelling here. However, spatial dependences are neglected here, for example in the groundwater budget. However, there also exists systems for space/time-explicit modelling. These take account of spatial dependences.

Examples of dynamic, process-based plant growth models include, inter alia, Apsim, Lintul, Epic, Hermes, Monica, STICS. A comparison of the model and corresponding literature relating to the models can be found, for example, in the following publication and references cited therein: H. Hoffmann et al.: Impact of spatial soil and climate input data aggregation on regional yield simulations. PLoS ONE 11(4): e0151782. doi:10.1371/journal.pone.0151782.

The modelling of plant growth may include the following parameters:

(a) Weather: daily precipitation totals, radiation totals, daily minimum and daily maximum air temperatures and temperature close to the ground and soil temperature, wind speed, inter alia (b) Soil: soil type, soil texture, soil character, field capacity, permanent wilting point, organic carbon, mineral nitrogen content, lodging density, van Genuchten parameters, inter alia (c) Crop plant: species, variety, species-specific parameters, for example specific leaf area index, temperature totals, maximum root depth, inter alia.

(d) Cultivation measures: seed, sowing date, sowing density, sowing depth, fertilizer, amount of fertilizer, number of fertilizer dates, fertilizer date, soil conditioning, harvest residues, crop rotation, distance from field of the same crop the year before, irrigation, inter alia.

With the aid of a plant growth model, it is also possible to calculate the amount of biomass present at any juncture and/or the size of the leaf area and/or the amount of fruits (fruit mass) and/or the number of shoots present and/or the like. It is conceivable that a plant having more biomass and/or a greater leaf area requires a greater amount of crop protection product than a plant having less biomass and/or a smaller leaf area. It is conceivable that the amount of biomass present—especially in the form of fruit—at the time of application of a crop protection product exerts an influence on the amount of residue. In a preferred embodiment of the present invention, therefore, the amount of biomass of the crop plant being grown that is present at any time (especially at the time of application of a crop protection product) is included in the calculation of an amount of residue.

It is also possible to ascertain and/or predict the amount of biomass present and/or to optimize plant growth models using remote sensing data. "Remote sensing data" are digital information that has been obtained remotely, for example by satellites, from the surface of the earth. It is also conceivable to use aircraft (unmanned (drones) or manned) for the recording of remote sensing data. The remote sensors generate digital images of regions of the surface of the earth from which information can be obtained about the vegetation that exists there and/or the environmental conditions that exist there (see, for example, M. S. Moran et al.: *Opportunities and Limitations for Image-Based Remote Sensing in Precision Crop Management, Remote Sensing of Environment* (1997) 61: 319-346). The data from these sensors are sourced via the interfaces provided by the supplier and may include optical and electromagnetic (e.g. Synthetic Aperture Radar SAR) datasets at various stages of processing.

It is also possible to use sensors in the field in order to determine the stage of growth and/or the available biomass of the crop plants. The sensors may be in a stationary position in the field; it is also conceivable to equip agricultural machinery and/or robots that move through the field with appropriate sensors.

Junctures/periods of time at which/in which crop protection products are applied may guided by the stages of development and/or the spread of harmful organisms. Prediction models are also available for the development and/or spread of harmful organisms (see, for example: WO2017/222722A1, WO2018/058821A1, US20020016676, US20180018414A1, WO2018/099220A1). With the aid of such models, it is possible to predict times at which there will be a high risk of infestation of the crop plants with harmful organisms. Control of the harmful organisms with a crop protection product is preferably undertaken when the (calculated) risk of infestation is particularly high (for example surpasses a defined threshold). The models for prediction of infestation with a harmful organism typically use weather data and historical data.

In a preferred embodiment, the amount of residue is predicted on the basis of the following input information: crop plant grown, country/or region in which the crop plant is growing or amount of biomass and/or fruit mass present in the crop plant grown at the time of application of the crop protection product (or a parameter that correlates therewith, for example the diameter of a plant or a fruit), crop protection product used or to be used, application rate of the crop protection product used or to be used, and length of the period of time between the juncture of application and the juncture of harvesting. It is particularly advantageous when not only the input information mentioned but also one or more of the following further pieces of input information relating to weather conditions during the growth phase are included in the calculation: insolation (for example in the form of hours of sunshine), humidity and/or temperature.

In a preferred embodiment, the amount of residue is calculated on the basis of the following input information:

crop plant being grown
crop protection product used
number of applications of the crop protection product and amounts applied each time
period of time between the last application and harvesting time
average air and/or soil temperature on the respective days of application
average air humidity on the respective days of application
accumulated radiation energy (insolation or artificial lighting) on the respective days of application
average diameter and/or average height of the crop plants grown on the respective application days.

In a further preferred embodiment, the amount of residue is calculated on the basis of the following input information:
crop plant being grown
crop protection product used
number of applications of the crop protection product and amounts applied each time
period of time between the last application and harvesting time
geographic position of at least one point in the field in which the crop plant is being grown, or a statement relating to growing of the crop plant in a greenhouse
optionally a statement as to whether the crop plant is being grown in a film tunnel
average diameter and/or average height of the crop plants being grown and/or average volume of fruits and/or average fruit mass on the respective application dates.

The device of the invention and system of the invention are configured to calculate, on the basis of the information available (input information, information derived (for example calculated) from the input information and/or using input information read out from a data medium or multiple data media), the amount of at least one residue of a crop protection product in and/or on the crop plant or in and/or on part of the crop plant, preferably at the time of harvesting. If there is still a significant reduction in the amount of residue after harvesting (for example during storage, as a result of washing and/or the like), the amount of residue can (also) be calculated for a different time from the time of harvesting and/or for a condition after a specific treatment (for example washing, exposure to electromagnetic radiation, heat and/or cold treatment and/or the like).

The amount of the at least one residue can be calculated, for example, on the basis of empirically ascertained data relating to the distribution of crop protection products in parts of the crop plant and to the degradation of crop protection products.

In a particularly preferred embodiment, the amount of the at least one residue of a crop protection product is calculated with the aid of a hybrid model. This means that degradation of the crop protection product is based on a mathematical function, the parameters of which are ascertained with the aid of a machine learning model on the basis of input data. This approach is elucidated hereinafter by example, without limiting the invention to that example.

As already mentioned, degradation over time can be approximated for many crop protection products by an exponential decrease. Such an exponential decrease can be described by the following mathematical function relationship:

$$N(t) = N_0 \cdot e^{-\frac{t}{\tau}}$$

N(t) is the time-dependent amount of crop protection product in or on the parts of the crop plant intended for human and/or animal consumption, t denotes the time, $N_0$ is the amount of crop protection product at time $t=0$ and $\tau$ is the period of time within which the parameter N falls to $1/e$ times (about 37%) in each case.

If the parameters of starting amount $N_0$ and time constant $\tau$ are known, it is possible for any time t to calculate the amount N(t) of crop protection product, for example for the time of harvesting of the crop plant.

In a preferred embodiment of the present invention, the parameters of the mathematical function relationship (in the present example starting amount $N_0$ and time constant $\tau$) are ascertained by means of a machine learning model. This approach has the advantage that no knowledge is required as to how the individual pieces of input information influence the amount of residue. Instead, a machine learning model is used, which learns the relationships between the input information and the amount of residue from numerous examples.

The machine learning model uses the input information to calculate the parameters of the mathematical function relationship. The machine learning model can be trained, for example, in a supervised training process using training data, to learn a relationship between the input information and the parameters of the mathematical function equation. What has been learnt can then be applied to forecasting new data (input information). The training data can be ascertained empirically and comprise pairs of input and output data. The input data represent the input information, typically in the form of a feature vector. The output data represent the parameters of the mathematical function equation, which can be ascertained using measured amounts of residue.

In other words, for a multitude of crop plants, growth conditions, environmental conditions, crop protection products and/or application conditions, it is possible to empirically determine the amounts of crop protection product residue that arise at the time of harvesting, for example. These empirically obtained data can be used to ascertain the parameters of the mathematical function equation that describes the decrease in the crop protection product over time. Finally, the machine learning model is trained to map the input information (typically in the form of a feature vector) to the parameters of the mathematical function equation. It is not necessary to examine and to understand the specific influence of individual pieces of input information on the amount of residue.

It is generally the case that a feature vector combines the (preferably numerically) parametrizable properties (features) of an object (the input information in the present case) in a vectorial manner. Various features characteristic of the object form the various dimensions of said vector. The entirety of possible feature vectors is called the feature space. Many machine learning algorithms require a numerical representation of objects since such representations facilitate or actually enable the processing of the data and statistical analysis. The generation of the feature vector thus serves to bring the input information ascertained and/or received into a form that enables computer-assisted processing. Examples of the generation of feature vectors can be found in the prior art (see, for example, J. Frochte: *Maschinelles Lernen,* 2nd ed., Hanser-Verlag 2019, ISBN: 978-3-446-45996-0).

The machine learning model may, for example, be an artificial neural network.

Such an artificial neural network comprises at least three layers of processing elements: a first layer with input neurons (nodes), an nth layer with at least one output neuron (nodes) and n–2 inner layers, where n is a natural number and greater than 2.

The input neurons serve to receive the values of the feature vector of the input information. In such a network, the at least one output neuron serves to output at least one parameter of the mathematical function equation. The processing elements of the layers between the input neurons and the at least one output neuron are connected to one another in a predetermined pattern with predetermined connection weights.

The training of the neural network can, for example, be carried out by means of a backpropagation method. The aim here in respect of the network is maximum reliability of mapping of given input vectors onto given output vectors. The mapping quality is described by an error function. The goal is to minimize the error function. In the case of the backpropagation method, an artificial neural network is taught by the alteration of the association weights.

In the trained state, the association weights between the processing elements contain information with regard to the relationship between the input information (in the form of the feature vector) and the at least one parameter in the mathematical function equation that describes the decrease in the crop protection product over time.

A cross-validation method can be used in order to divide the data into training and validation datasets. The training dataset is used in the backpropagation training of network weights. The validation dataset is used to ascertain the prediction accuracy of the trained network.

Details of the creation and the training of artificial neural networks are described, for example, in: G. Ciaburro et al.: *Neural Networks with R,* Packt Publishing 2017, ISBN: 978-1-78839-787-2; T. Rashid: *Make Your Own Neural Network,* O'Reilly 2016, ISBN: 978-1530826605.

The amount of the residue ascertained can be output to a user. The output takes the form, for example, of text and/or numbers and/or graphics on a monitor (screen) and/or printer of the device/system of the invention.

In a preferred embodiment, the amount of residue ascertained is compared with a maximum amount or with multiple maximum amounts. The at least one maximum amount is, for example, a legally approved upper limit for a residue in a crop plant for the respective crop protection product.

The at least one maximum amount may also be an upper limit of a residue in a crop plant required by a trader for the respective crop protection product. A "trader" in the context of the present invention is preferably a natural or legal person that buys crop plants or parts of crop plants from a producer or intermediate trader and sells them on (for example to an end customer (consumer)).

The at least one maximum amount may also be an amount defined by a user.

The at least one maximum amount may be stored in a data medium or multiple data media that can be accessed by the device of the invention and the system of the invention.

In a preferred embodiment, the extent to which the amount of residue ascertained is above or below one or more maximum amounts is displayed to the user. It is conceivable that the user specifies a country or region, and whether and/or the extent to which the amount of residue ascertained is above or below the upper limit approved for the specified country or region is displayed to the user. It is conceivable that the user can specify multiple countries/regions. It is conceivable that the user specifies a trader, and whether and/or the extent to which the amount of residue ascertained is above or below the upper limit approved by the specified trader is displayed to the user. It is conceivable that the user can specify multiple traders.

In a preferred embodiment, the amount of the residue of the crop protection product ascertained is output in the form of a percent figure and/or in the form of a graphic representation of the percent figure, where the percent figure indicates the percentage of the amount of residue calculated of a maximum, preferably legally or officially permitted, amount of residue and/or a maximum amount of residue stipulated by a trader. In a preferred embodiment, the user is able to select a country/region or multiple countries/regions, and the size of the amount of residue calculated in relation to the maximum amount of residue stipulated in the country/region is displayed. In a preferred embodiment, the user is able to select one or more traders, and the size of the amount of residue calculated in relation to the maximum amount of residue stipulated by the trader is displayed.

In a preferred embodiment, the calculated amount of residue is based on the maximum residue limit/level (MRL) stipulated by an official body. The maximum residue limit is the maximum permissible residue concentration. In the EU, for example, the European Medicines Agency (EMA) is responsible for recommending maximum residue levels which, under its recommendation, are made legally valid standards for food safety by the European Commission.

The maximum residue level is normally ascertained by repeated field trials (in the order of magnitude of 10) in which the harvest has been treated according to good agricultural practice (GAP), and an appropriate preharvest interval or an appropriate period of time has elapsed. For many pesticides, the upper residue limit is at their limit of detection (LOD). The limit of quantification (LOQ) is frequently used rather than the LOD. The rule of thumb is that the LOQ value is about twice the LOD value. For substances not included in the annexes of the EU standards, the standard maximum residue level normally applicable is 0.01 mg/kg (see e.g. https://ec.europa.eu/food/plant/pesticides/max_residue_levels_en). Instead of or as well as the MRL value, the amount of residue calculated can also be expressed in relation to other customary parameters, for example ARfD, ADI and/or TDI. Acute reference dose (ARfD) is an estimate of the amount of a substance in food or drinking water that can be ingested by the consumer over a short period of time, normally during a mealtime or a day, without significant risk to health. Acceptable daily intake (ADI) refers to the dose of a substance that is considered to be medically benign in the case of lifelong daily ingestion. In the case of unwanted impurities, this is also called tolerable daily intake (TDI).

In a preferred embodiment, the device/system of the invention is configured such that, at defined junctures or in the event of occurrence of defined events, the calculation of the amount of residue is updated to take account of a change in the growing conditions, in the crop protection product, in environmental conditions and/or in the application parameters. For example, a first calculation of the amount of residue may be based on a climate typical of the respective country or region in which the crop plant is being grown. Over the course of the vegetation period, the calculation is then adjusted to the actual weather conditions. In an analogous manner, the calculation can be updated on the basis of the applications of a crop protection product that have actually been implemented. In addition, an update can be made on the basis of sensor data (for example remote sensing data and/or field data), where the sensor data can give information, for example, as to the state of development of the crop plant and/or an expected harvest yield. It is also conceivable that a first calculation of the amount of residue is made on the basis of weather forecasts, while a subsequent (updated) calculation of the amount of residue is made on the basis of the actual weather.

In a preferred embodiment, the device/system of the invention is configured such that the user can change the crop protection product specified and/or change the application parameters, after which the amount of a residue of the crop protection product is recalculated and displayed. This enables planning by the user. The user is able to evaluate how a change in the crop protection product and/or in the application parameters affects the amount of residue.

In a preferred embodiment, the device/system of the invention is configured, in reaction to a user input for optimization of the amount of residue, to alter the crop protection product and/or the application parameters so as to result in a minimum amount of residue. In the case of such an optimization, it may be the case that the user can decide which parameters are variable and which are invariable. The device/system then alters the variable parameters until a minimum amount of residue is attained, and outputs the altered parameters and the (minimum) amount of residue calculated to the user. Methods of mathematical optimization can be found in the numerous textbooks on this topic (see, for example, Peter Gritzmann: *Grundlagen der Mathematischen Optimierung* [Fundamentals of Mathematical Optimization], Springer Spektrum 2013, ISBN: 978-3-528-07290-2).

FIG. 1 shows, by way of example and in schematic form, an embodiment of the device of the invention. The device (10) comprises an input unit (11), a control and calculation unit (12) and an output unit (13). A user can use the input unit (11) to input information and control commands into the device. The output unit (13) can output information to a user, preferably displayed on a monitor. The control and calculation unit (12) serves primarily to control the components of the device (10), for processing of the input and output information and for performance of calculations and logical operations.

The control and calculation unit (12) is configured to
trigger the input unit to receive and/or to ascertain the following input information:
crop plant being grown,
crop protection product used,
number of applications of the crop protection product and amounts applied each time,
periods of time between the application(s) and harvesting time,
information relating to the biomass of the crop plant that was present on each application of the crop protection product,
environmental conditions during the growing of the crop plant, especially on and/or after the application(s) of the crop protection product,
calculate an amount of a residue of the crop protection product in and/or on the parts of the crop plant intended for human and/or animal consumption at the time of harvesting of the crop plant, using the input information, and
trigger the output unit to output information relating to the amount of residue.

FIG. 2 shows, by way of example and in schematic form, a further embodiment of the device of the invention. As well as the input unit (11), the control and calculation unit (12) and the output unit (13) as described in relation to FIG. 1, the device (10) is connected to a data medium (30), for example via a network. The data medium (30) can store, for example, information relating to crop plants (for example preferred growing conditions), to crop protection products (for example preferred application parameters), to the climate of a country or region, to the weather of a country or region, to the spread of harmful organisms in a country or region and/or the like. The control and calculation unit (12) may be configured to access the information stored on the data medium (30) and use it for calculation of the amount of the residue of a crop protection product. In addition, the control and calculation unit (12) may be configured to store information on the data medium (30). It is conceivable that the data medium (30) comprises multiple data media. One or more models which can be used to calculate amounts of residue, such as for example plant growth models, models for the degradation of crop protection products and/or the like, can also be stored in a such a data medium.

FIG. 3 shows, by way of example and in schematic form, an embodiment of the system of the invention. The system (S) comprises a first computer system (10) and a second computer system (20). The first computer system (10) preferably takes the form of a desktop, laptop or tablet computer or of a smartphone. The second computer system (20) preferably takes the form of a server. The first computer system (10) is operated by a user. The first computer system (10) serves as communication interface between the user and the system (S). The second computer system (20) serves to take on some functionalities that are executed by the control and calculation unit of the device of the invention. Reasons for the movement of functionalities to a second computer system may be:

calculations require a high computing power; these calculations are transferred to a server equipped with the corresponding computing power;

calculations should always be based on the newest versions of models and current data; these newest versions of models and current data are provided by means of a server.

Typically, there is a multitude of first computer systems that are operated by different users, and only one second computer system or a relatively small number (compared to the number of first computer systems) of second computer systems that provide(s) resources (computing power, data, models) for the multitude of first computer systems via a network or multiple networks.

The first computer system (10) comprises an input unit (11), a first control and calculation unit (12), an output unit (13) and a first transmitter and receiver unit (14). The second computer system (20) comprises a second control and calculation unit (22) and a second transmitter and receiver unit (24). The first computer system (10) and the second computer system (20) can exchange information via a network (represented by the dotted line between the first transmitter and receiver unit (14) of the first computer system (10) and the second transmitter and receiver unit (24) of the second computer system (20)). The network may comprise a mobile network, for example one based on the GSM, GPRS, 2G, 3G, LTE, 4G, 5G standard or another standard.

The first control and calculation unit (12) is configured to receive the following input information from a user via the input unit (11):

crop plant being grown, crop protection product used, number of applications of the crop protection product and amounts applied each time, periods of time between the application(s) and harvesting time, optionally: information relating to the biomass of the crop plant that was present on each application of the crop protection product, optionally: environmental conditions during the growing of the crop plant, especially on and/or after the application(s) of the crop protection product.

The first control and calculation unit (12) is configured to trigger the first transmitter and receiver unit (14) to transmit the input information via the network to the second computer system (20).

The second control and calculation unit (22) is configured to trigger the second transmitter and receiver unit (24) to receive the input information via the network.

The second control and calculation unit (22) is configured to ascertain the following information if the information has not already been transmitted by the first computer system (10):

information relating to the biomass of the crop plant that was present on each application of the crop protection product and/or environmental conditions during the growing of the crop plant, especially on and/or after the application(s) of the crop protection product.

This further input information can be read out, for example, from one or more databases that may be connected to the second computer system (20) via a network connection and/or using input information that has been ascertained by the first computer system (10), and/or calculated using information from the one or more databases.

The second control and calculation unit (22) is configured to calculate an amount of a residue of the crop protection product in and/or on the parts of the crop plant intended for human and/or animal consumption, preferably at the time of harvesting, on the basis of the input information.

The second control and calculation unit (22) is configured to trigger the second transmitter and receiver unit (24) to transmit the amount of the residue via the network to the first computer system (10).

The first control and calculation unit (12) is configured to trigger the first transmitter and receiver unit (14) to receive the amount of the residue via the network.

The first control and calculation unit (12) is configured to trigger the output unit (13) to output the amount of the residue to the user.

The system (S) of the invention may comprise one data medium or multiple data media. Such a data medium can store information relating to crop plants (for example preferred growing conditions), to crop protection products (for example preferred application parameters), to the climate of a country or region, to the weather of a country or region, to the spread of harmful organisms in a country or region and the like. Such a data medium may be a constituent of the first computer system (10) or of the second computer system (20) and/or a separate unit connected to the first computer system (10) and/or the second computer system (20) via a network.

FIG. 4 shows, by way of example and in schematic form, an embodiment of the method of the invention in the form of a flow diagram. The method (100) comprises the steps:

(110) specifying a crop plant (120) specifying growing parameters for growing the crop plant (130) specifying a crop protection product (140) specifying application parameters for application of the crop protection product (150) calculating an amount of a residue of the crop protection product in and/or on the parts of the crop plant intended for human and/or animal consumption, preferably at the time of harvesting (160) displaying the amount of residue to a user.

FIG. 5 shows, by way of example and in schematic form, the steps that are executed by a computer system on which the computer program of the invention is installed in the form of a flow diagram. The steps (200) comprise:

(210) receiving and/or ascertaining the following information:

crop plant being grown, crop protection product used, number of applications of the crop protection product and amounts applied each time, periods of time between the application(s) and harvesting time, information relating to the biomass of the crop plant that was present on each application of the crop protection product, environmental conditions during the growing of the crop plant, especially on and/or after the application(s) of the crop protection product, (220) calculating an amount of a residue of the crop protection product in and/or on the parts of the crop plant intended for human and/or animal consumption, preferably at the time of harvesting (230) displaying the amount of residue to a user.

FIG. 6 shows, by way of example and in schematic form, a flow diagram of the steps that are executed by a computer system on which a preferred embodiment of the computer program of the invention is installed. The steps (300) comprise:

(310) receiving the following input information from a user:

crop plant being grown, crop protection product used, number of applications of the crop protection product and amounts applied each time, periods of time between the application(s) and harvesting time, optionally: information relating to the biomass of the crop plant that was present on each application of the crop protection product, optionally: environmental conditions during the growing of the crop plant, especially on and/or after the application(s) of the crop protection product, (320) transmitting the input information to a second computer system (330) receiving an amount of a residue of the crop protection product in and/or on the parts of the crop plant intended for human and/or animal consumption, preferably at the time of harvesting, from the second computer system (340) displaying the amount of residue to a user.

FIG. 7 to FIG. 20 show, by way of example, displays of the computer program of the invention on a screen of the device of the invention or of the system of the invention.

FIG. 7 shows, by way of example, an input mask via which a user can log in with their username and a password.

Figure 1:
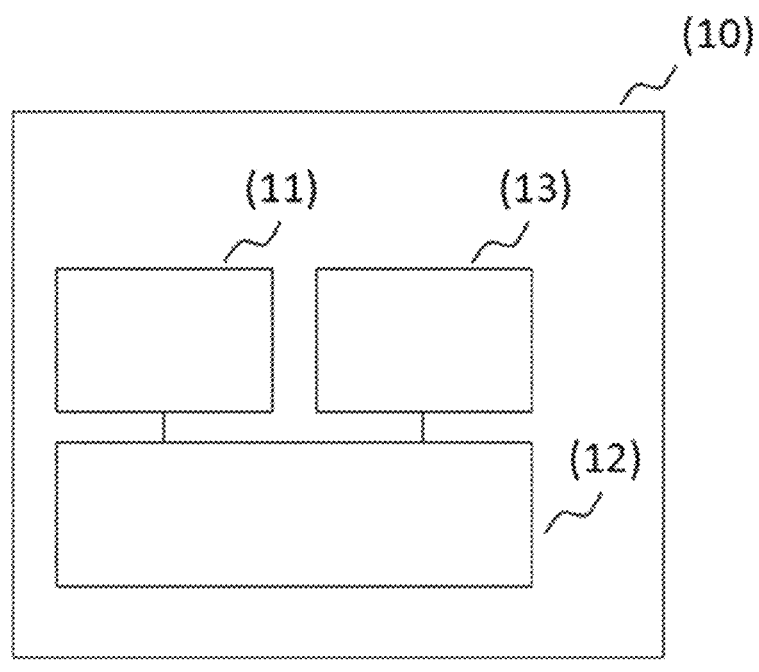
Figure 2:
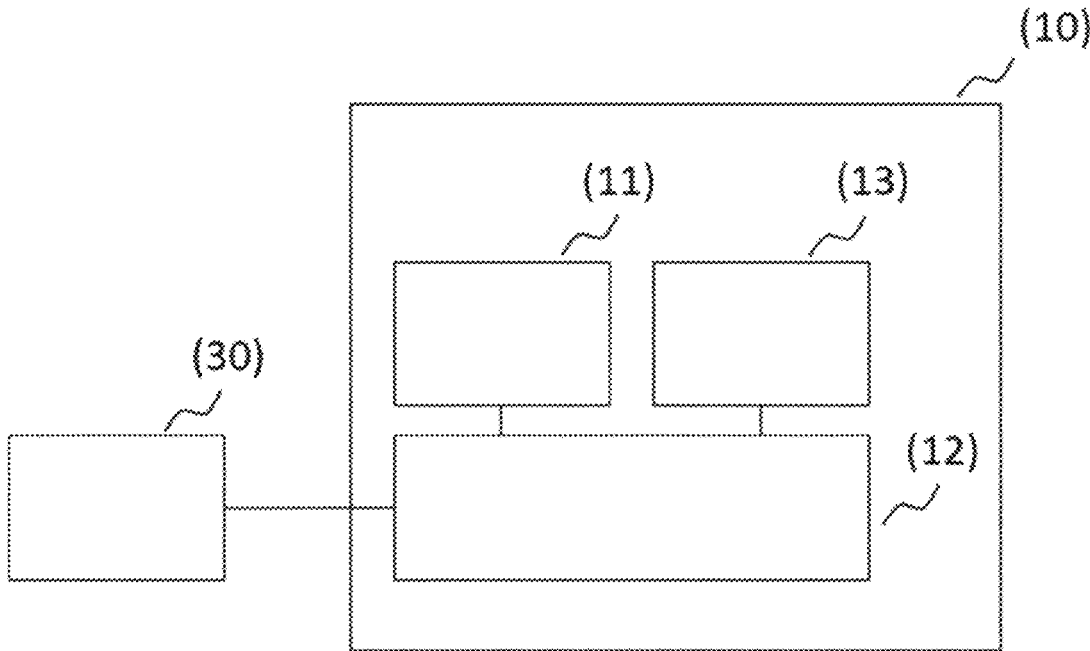
Figure 3:
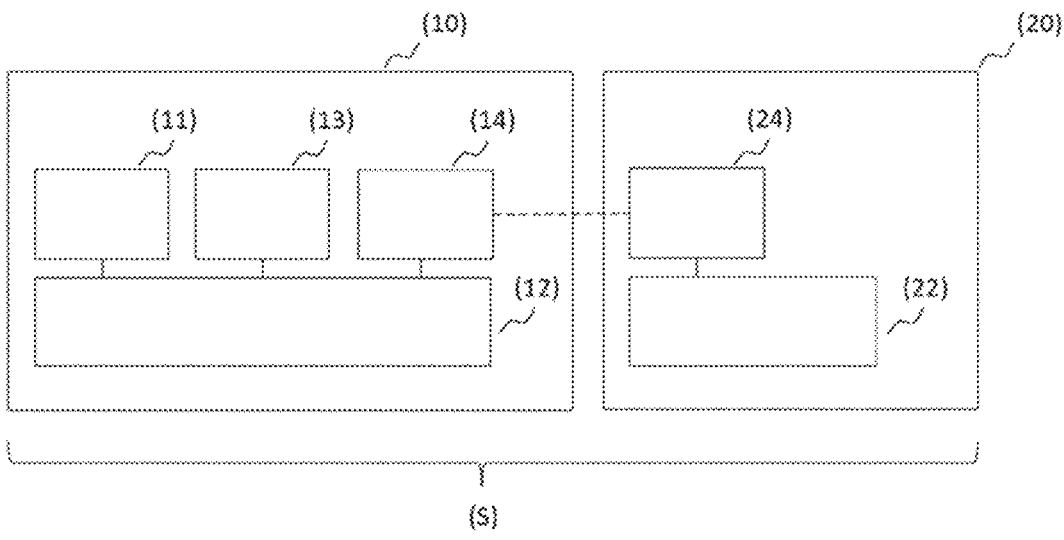
Figure 4:
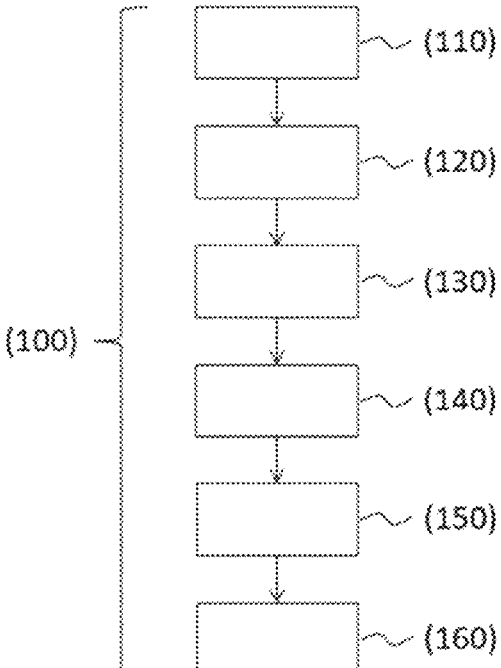
Figure 5:
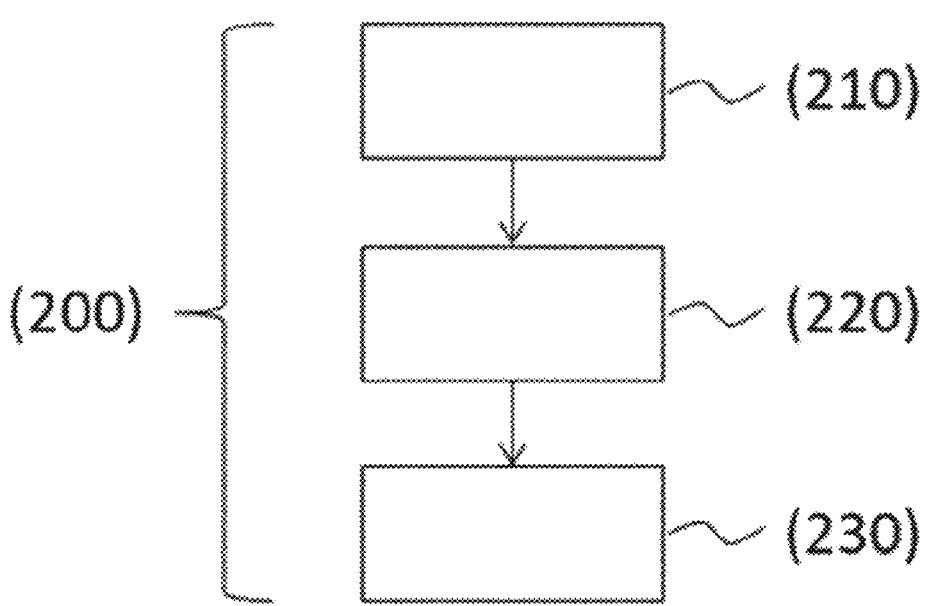
Figure 6:
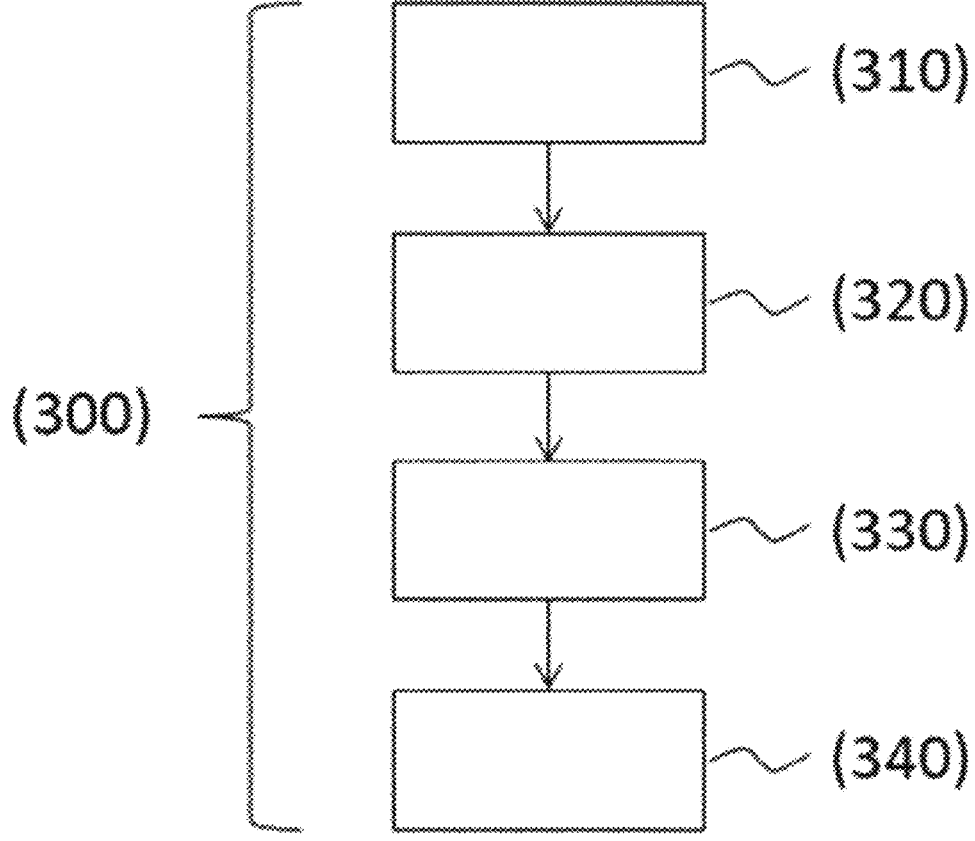
Figure 7:
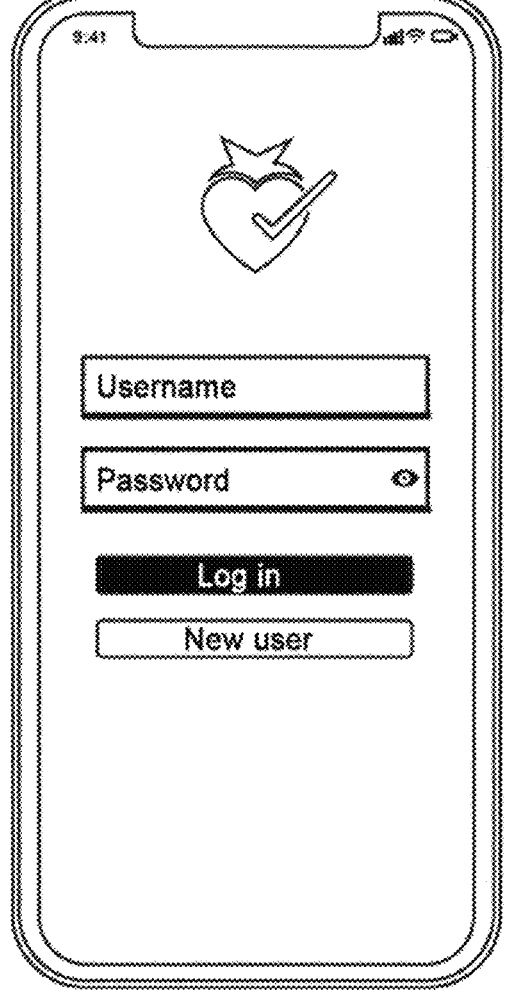
Figure 8:

Once the user has logged in, they can be requested to specify a field in which the crop plant is being grown or is to be grown. FIG. 8 shows a display of the computer program product of the invention that indicates that no field has been specified yet ("No Field Created Yet"). By clicking on the virtual button with the ⊕ symbol, a user can start a process for specifying a new field. The process is illustrated by way of example in FIG. 9 to FIG. 13.

Figures 9, 10:
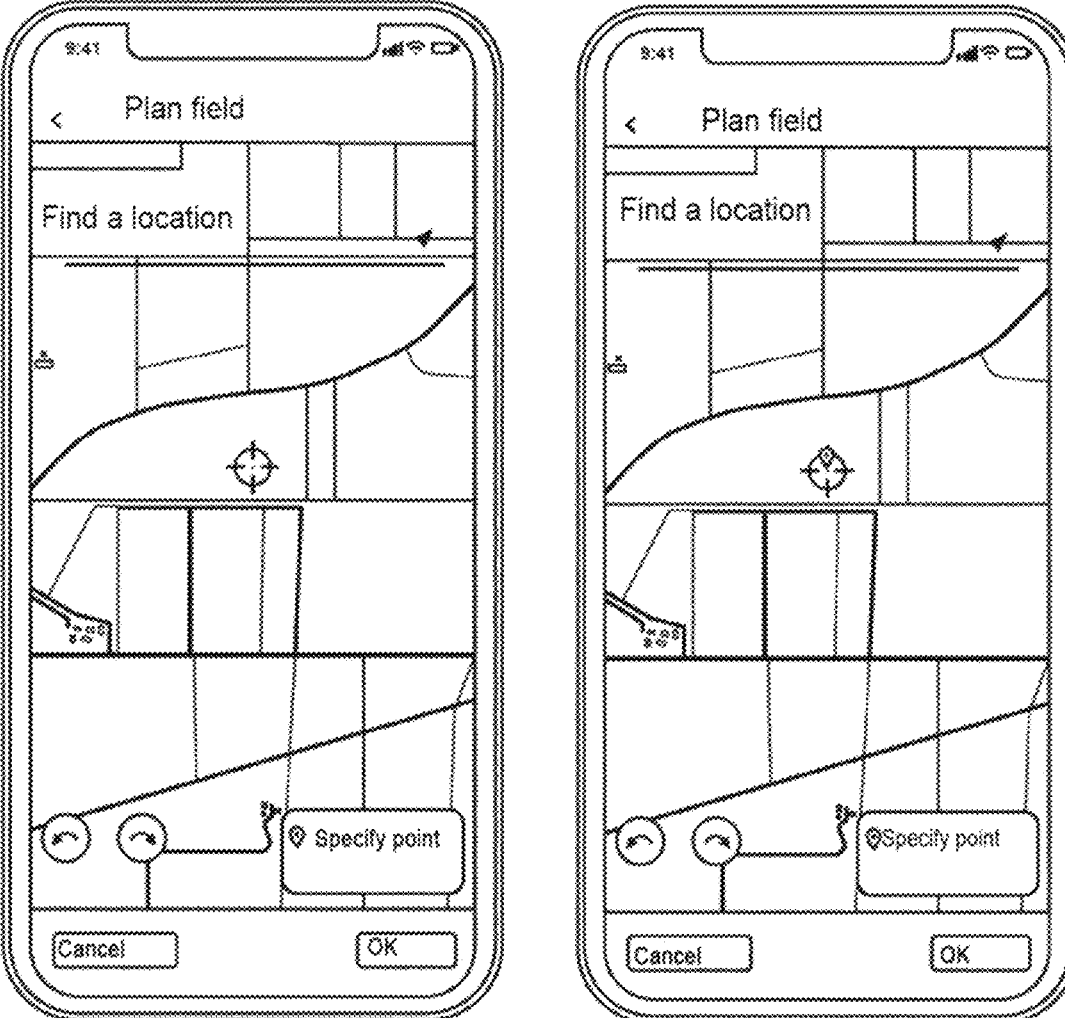

FIG. 9 shows a first display for the process for specifying a new field. It is possible to input the name of a location (e.g. country, place and/or street) into an input field ("Search for a place"). The display shows a detail of the surface of the earth in an aerial photograph or in the form of a map. On input of the name of a location, a detail of the surface of the earth including the location is shown. By means of the finger movements known from use of smartphones, the user is able to move the detail, enlarge the detail (zoom out) or reduce the size of the detail (zoom in).

In addition, by means of a virtual button ("Drop Point"), it is possible to specify a point within the field or at the edge of the field. On actuation of the virtual button, such a point is put in the middle of the target. This is shown in FIG. 10. FIG. 10 shows the same display as FIG. 9, except that a first point in the field has now been specified.

Figure 11:
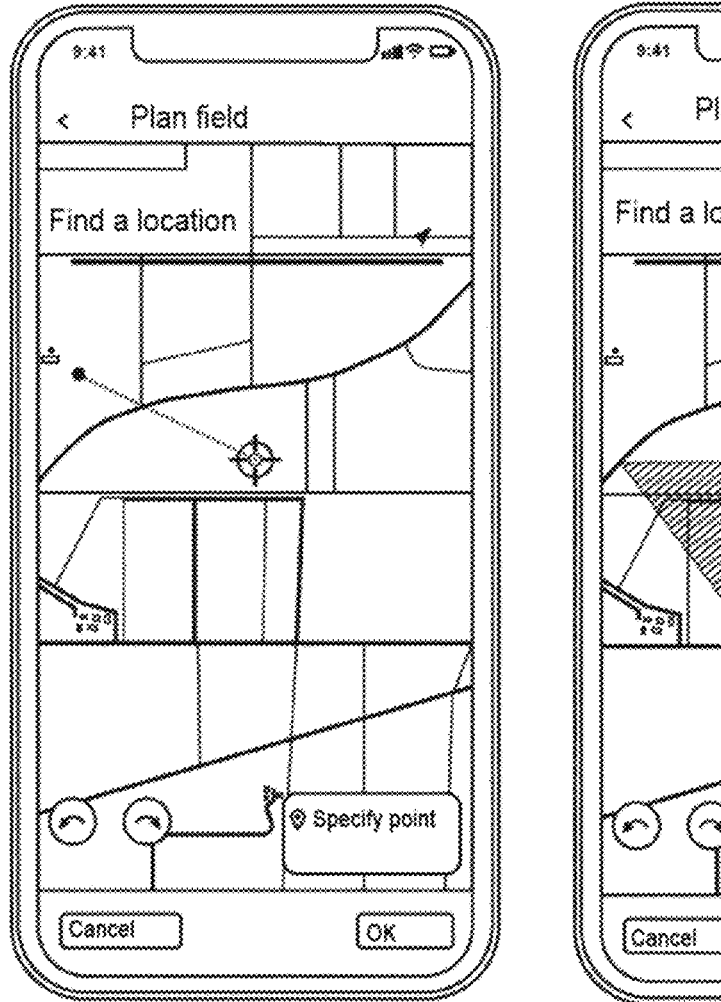
Figure 12:
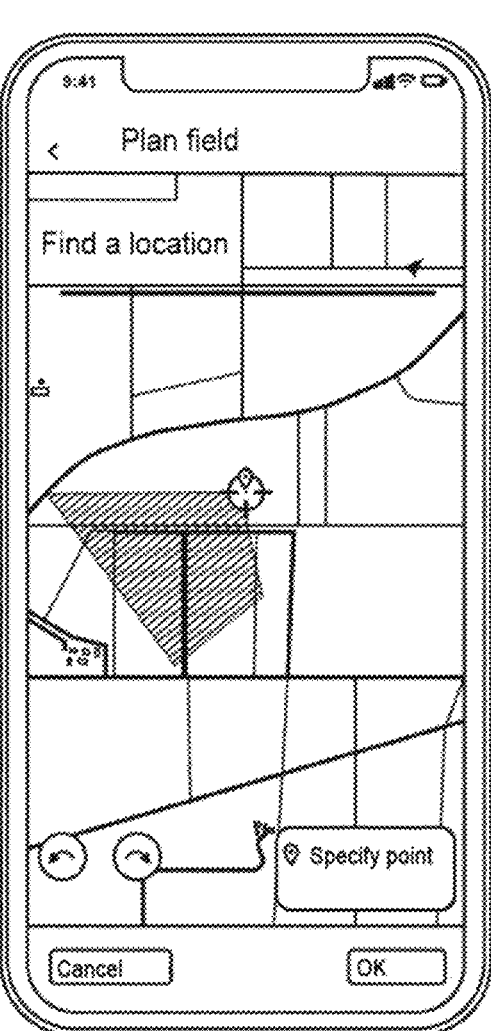

Proceeding from the point specified, a user can then place (fix) further points of the field. The points are joined to one another by straight lines. This is shown in FIG. 11 and FIG. 12.

Figure 13:
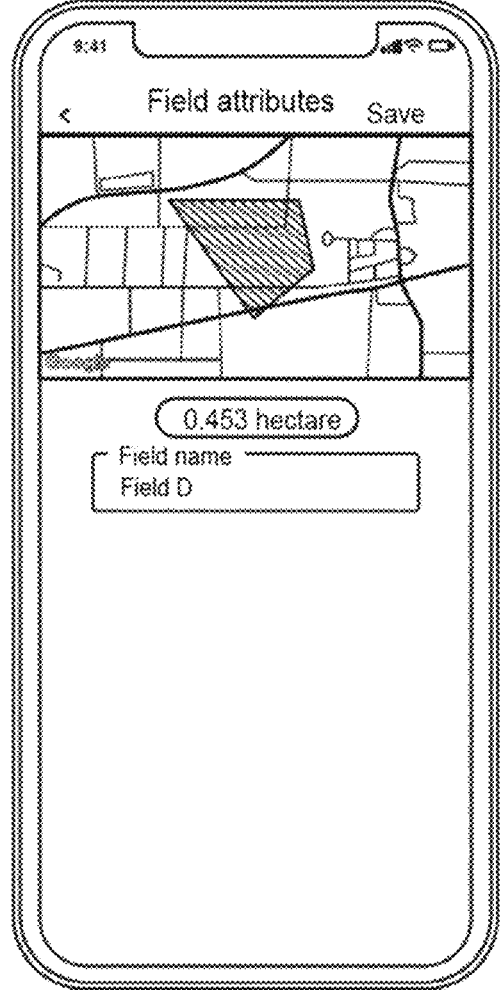

The computer program can be configured such that it automatically calculates the size for a field specified. FIG. 13 shows the field specified and the calculated size of the field ("0.453 Hectares"). The user can give a name to the field ("Field Name"); in the present case it is named "Field D".

Figure 14:
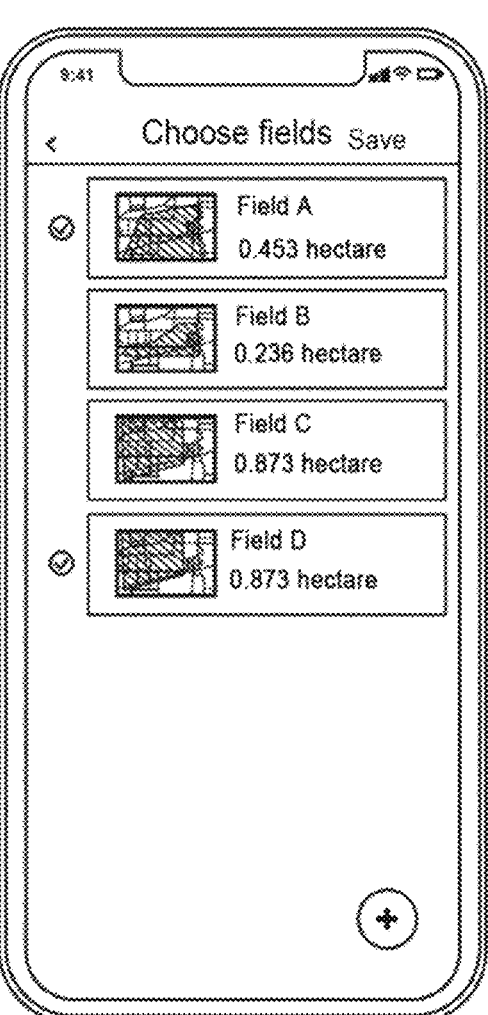

FIG. 14 shows a further display of the computer program of the invention. It is shown that four fields named "Field A", "Field B", "Field C", "Field D" have been set out. The user can select those fields for which they would like to have calculated a prediction of an amount of residue of a crop protection product. The virtual button with the S symbol indicates that further fields can be specified (set out in the computer program).

FIG. 15 shows a further display of the computer program of the invention. The computer program indicates to the user that no information has been specified to date as to the growing of a crop plant and the application of a crop protection product ("You Don't Have Any Crop Plans"). By actuating a virtual button ("Create Crop Plan"), the user is able to start a process for specifying the corresponding information. The process is illustrated in the form of images in FIG. 16.

FIG. 16 shows a display for creation of a growing plan for a crop plant ("Crop Plan Details"). The display comprises a series of input fields. In one input field, the user can give the respective growing plan a name ("Crop Plan Name"). In the present case, the name input by the user was "Plan A". In a further input field, the user can specify the crop plant ("Crop"). In the present case, this is accomplished by selection of an entry in a list. In the present case, the user has selected "strawberry" as the crop plant. In a further input field, the user can specify the crop plant variety ("Variety"). In the present case, the user has selected "Fortuna" as the crop plant variety. In a further input field, the user can specify the start of the growing period ("Season Start Date"). This can be effected by entering a date and/or by selecting a day in a virtual calendar. In the present case, the user has specified 17 Aug. 2019 as the start of the growing period. In a further input field, the user can specify the end of the growing period ("Season End Date"). This can be effected by entering a date and/or by selecting a day in a virtual calendar. In the present case, the user has specified 30 Mar. 2020 as the end of the growing period. The end of the growing period is typically the time of harvesting.

Figure 17:
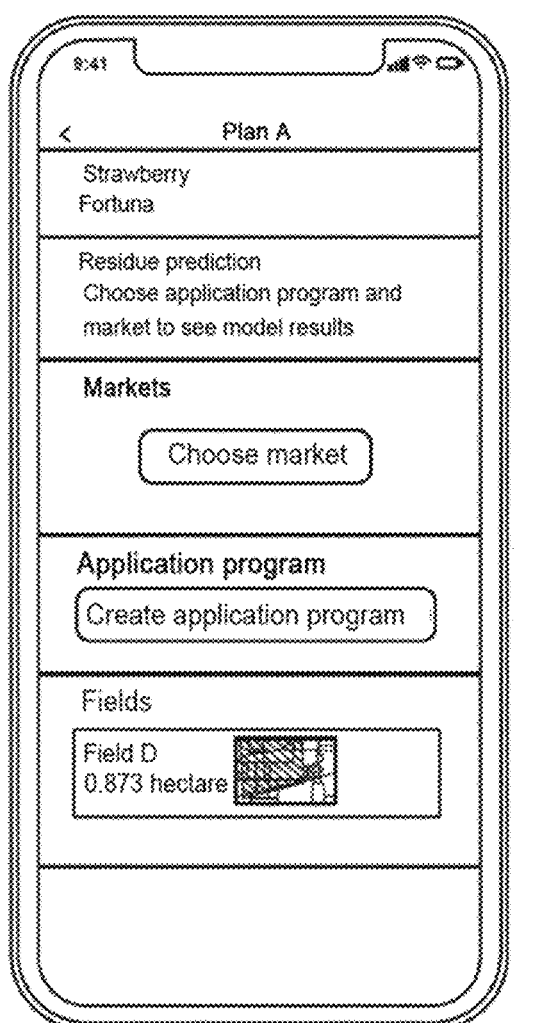

FIG. 17 shows a further display of the computer program of the invention. FIG. 17 indicates a growing plan named Plan A in an overview. The growing plan relates to the "strawberry" crop plant of the "Fortuna" variety. A field named "Field D" has been specified, on which the crop plant is (to be) grown. Before the computer program can calculate (predict) an amount of a residue of a crop protection product, it is necessary to specify one or more markets and an application program for at least one crop protection product ("Spray Plan"). By actuating the respective virtual button, the user is able to start a process for specifying a market ("Select Market") or a process for specifying an application program for at least one crop protection product ("Create Spray Plan").

Figure 18:

The process for specifying a market is shown by way of example in FIG. 18. The process for specifying an application program for at least one crop protection product is shown by way of example in FIG. 19.

The expression "market" in the present example represents a combination of a trader (or a store chain) and a country. FIG. 18 shows an overview of markets ordered by country. In the present case, store chains are listed for three countries: for Germany the store chains "ALDI", "Schwarz-Lidl" and "Rossmann", for Poland the store chains "Lidl" and "Frischemarkt", and for Spain the store chains "Mercadona", "Lidl" and "ALDI". The user can select one or more store chains by clicking. In the present case, the user has selected the following combinations: Germany: "ALDI", Germany: "Schwarz-Lidl", Poland: "Frischemarkt", Spain: "Mercadona". By actuating the virtual button, the user is able to create further markets ("Create Custom Market").

FIG. 19 shows a display with a number of input fields for specifying an application program for at least one crop protection product. A first input field can be used to specify the crop protection product by inputting a product name. In the present case, the product name "Luna" has been input. In a further input field, the user can input and/or select the date of application of the crop protection product In the present case, the user has specified 17 Nov. 2019 as the date. In a further input field, the user can input the application method. In the present case, the user has input "foliar application" as the application method. In two further input fields, the user can input the amount of crop protection product (to be) deployed ("Product Rate", "UOM" (=Unit of Measure)). In the present case, the user has input an amount of 0.75 l/ha. In a further input field, the user can input an amount of water deployed ("Water rates"). In the present case, the user has input an amount of 15 l/ha. In a further input field, the user can input the stage of development of the crop plant (on deployment of the crop protection product) in the form of the BBCH code ("Growth Stage (BBCH)"). In the present case, the user has input BBCH code 1 ("Stage 1").

FIG. 20 shows a display with results of a prediction. The results are predicted for the "strawberry" crop plant of the "Fortuna" variety. The results are based on an application program ("Plan A") in which 0.5 l/ha of a crop protection product designated "Prod. A" has been applied together with 20 l/ha of water at each of two junctures (10 May 2019 and 10 Jul. 2019). On 10 May 2019, the crop plant is/was at the development stage with BBCH code 2 ("Stage 2"); on 10 Jul. 2019, the crop plant is/was at the development stage with BBCH code 3 ("Stage 3").

The crop plant designated "Prod. A" comprises two active ingredients (fluopyram, trifloxystrobin). The date specified for which the prediction is made is 12 Nov. 2019 ("Residue Forecast on Nov. 12 2019"). The calculated (predicted)

amount of fluopyram residue is 0.82 mg/kg. The calculated (predicted) amount of trifloxystrobin residue is 0.82 mg/kg. Both amounts of residue are above the MRL value (0.67 mg/kg for fluopyram, 0.5 mg/kg for trifloxystrobin).

What is claimed is:

1. A device for predicting crop protection product residues in plants or parts of plants, the device comprising at least one processor configured to:

generate a first interface for display at a computer that displays one or more interactive menus that allows user selection of at least a type of crop plant, wherein the interface includes a virtual map element to allow a user clicking on the virtual map element by means of finger movements to enlarge a size of a detail of the virtual map element or reduce the size of the detail of the virtual map element;

receive the following input information:

a field location via a selection at the virtual map element of the first interface;

a crop plant being grown at the field location by selection of the crop plant at the one or more interactive menus of the first interface;

a crop protection product used;

a number of applications of the crop protection product and amounts applied each time;

periods of time between the application(s) and harvesting time;

information relating to biomass of the crop plant that was present on each application of the crop protection product; and environmental conditions during growing of the crop plant, especially on and/or after the application(s) of the crop protection product;

calculate an amount of a residue of the crop protection product in and/or on parts of the crop plant intended for human and/or animal consumption at the harvesting time of the crop plant, using the input information;

wherein the amount of residue is calculated on the basis of a mathematical function relationship, wherein the mathematical function relationship describes degradation of the crop protection product as a function of time, wherein the mathematical function relationship has at least one parameter, wherein the at least one parameter is calculated with the aid of a machine learning model on the basis of one or more of the input information;

automatically update the calculated amount of residue of the crop protection product in response to a weather event at the crop plant and/or sensor data for the crop plant;

generate a second interface for display at the computer, the second interface displaying the calculated amount of residue relative to a target maximum amount of residue for the crop protection product; and in response to a difference between the calculated amount of residue of the crop protection product and the target maximum amount of residue for the crop protection product being greater than a defined difference:

automatically identify an alternate crop protection product for the crop plant;

calculate an amount of a residue of the alternate crop protection product in and/or on parts of the crop plant intended for human and/or animal consumption at the harvesting time of the crop plant; and generate an updated second interface for display at the computer, the updated second interface displaying the amount of residue of the alternate crop protection product relative to a target maximum amount of residue for the alternate crop protection product.

2. The device as claimed in claim 1, wherein the mathematical function relationship is an exponential function, wherein the exponential function has two parameters, a starting value and a time constant, wherein the two parameters are calculated with aid of the machine learning model on the basis of one or more of the input information.

3. The device as claimed in claim 2, wherein the machine learning model has been trained in a monitored learning method using training data to learn a correlation between the one or more of the input information, preferably represented by a feature vector, and the at least one parameter of the mathematical function relationship.

4. The device as claimed in claim 1, wherein the at least one processor is configured to:

ascertain the target maximum amount of residue for the crop protection product in the crop plant or parts thereof;

compare the calculated amount of the residue with the target maximum amount ascertained; and update the second interface to display whether and/or to what extent the calculated amount of the residue is above or below the maximum amount.

5. The device as claimed in claim 1, wherein the at least one processor is configured to:

identify countries and/or regions for which the calculated amount of the residue does not exceed any officially approved upper limit for the residue in the crop plant or parts thereof and/or identify traders for which the calculated amount of residue does not exceed any stipulated upper limit for the residue in the crop plant or parts thereof; and update the second interface to display the countries and/or regions and/or traders that have been identified.

6. The device as claimed in claim 1, wherein the amount of the residue is displayed to a user as a proportion of a maximum amount stipulated by an official authority and/or a trader.

7. The device of claim 1, wherein the second interface further includes an indication of the crop plant being grown and the crop protection product used.

8. A computer-implemented method comprising the steps of:

generating, by means of a computer system, a first interface for display at a computer that displays one or more interactive menus that allows user selection of at least a type of crop plant, wherein the interface includes a virtual map element to allow a user clicking on the virtual map element by means of finger movements to enlarge a size of a detail of the virtual map element or reduce the size of the detail of the virtual map element;

receiving and/or ascertaining input information by means of the computer system, wherein the input information includes:

a field location received and/or ascertained via a selection at the virtual map element of the first interface;

a crop plant being grown at the field location received and/or ascertained by selection of the crop plant at the one or more interactive menus of the first interface;

a crop protection product used;

a number of applications of the crop protection product and amounts applied each time;

periods of time between the application(s) and harvesting time;

information relating to biomass of the crop plant that was present on each application of the crop protection product; and environmental conditions during growing of the crop plant, especially on and/or after the application(s) of the crop protection product;

calculating an amount of a residue of the crop protection product in and/or on parts of the crop plant intended for human and/or animal consumption, preferably at the time of harvesting, by means of the computer system;

wherein the amount of residue is calculated on the basis of a mathematical function relationship, wherein the mathematical function relationship describes degradation of the crop protection product as a function of time, wherein the mathematical function relationship has at least one parameter, wherein the at least one parameter is calculated with the aid of a machine learning model on the basis of one or more of the input information;

generating a second interface for display at the computer, the second interface displaying the calculated amount of residue and a target maximum residue level for the crop protection product; and in response to a difference between the calculated amount of residue of the crop protection product and the target maximum amount of residue for the crop protection product being greater than a defined difference:

automatically identifying an alternate crop protection product for the crop plant;

calculating an amount of a residue of the alternate crop protection product in and/or on parts of the crop plant intended for human and/or animal consumption at the harvesting time of the crop plant; and generating an updated second interface for display at the computer, the updated second interface displaying the amount of residue of the alternate crop protection product relative to a target maximum amount of residue for the alternate crop protection product.

9. The method as claimed in claim 8, wherein the mathematical function relationship is an exponential function, wherein the exponential function has two parameters, a starting value and a time constant, wherein the two parameters are calculated with aid of the machine learning model on the basis of one or more of the input information.

10. The method as claimed in claim 9, wherein the machine learning model has been trained in a monitored learning method using training data to learn a correlation between the one or more of the input information, preferably represented by a feature vector, and the at least one parameter of the mathematical function relationship.

11. A system comprising:

a first computer system executed by a first processor;

a second computer system executed by a second processor;

wherein the first computer system is configured to generate a first interface for display at a computer that displays one or more interactive menus that allows user selection of at least a type of crop plant, wherein the interface includes a virtual map element to allow a user clicking on the virtual map element by means of finger movements to enlarge a size of a detail of the virtual map element or reduce the size of the detail of the virtual map element;

wherein the first computer system is configured to receive and/or ascertain the following input information:

a field location via a selection at the virtual map element of the first interface;

a crop plant being grown;

a crop protection product used at the field location by selection of the crop plant at the one or more interactive menus of the first interface;

a number of applications of the crop protection product and amounts applied each time;

periods of time between the application(s) and harvesting time;

wherein the first computer system is configured to transmit the input information via a network to the second computer system;

wherein the second computer system is configured to receive the input information via the network;

wherein the second computer system is configured to ascertain the following further input information if the further input information has not already been transmitted by the first computer system:

information relating to biomass of the crop plant that was present on each application of the crop protection product; and/or environmental conditions during growing of the crop plant, especially on and/or after the application(s) of the crop protection product;

wherein the second computer system is configured to:

calculate an amount of a residue of the crop protection product in and/or on parts of the crop plant intended for human and/or animal consumption, preferably at the time of harvesting, on the basis of the input information;

wherein the amount of residue is calculated on the basis of a mathematical function relationship, wherein the mathematical function relationship describes degradation of the crop protection product as a function of time, wherein the mathematical function relationship has at least one parameter, wherein the at least one parameter is calculated with the aid of a machine learning model on the basis of one or more of the input information; and transmit the amount of the residue via the network to the first computer system; and wherein the first computer system is configured to:

receive the amount of the residue via the network;

generate a second interface for display at the computer, the second interface the calculated amount of residue and a target maximum residue level for the crop protection product; and in response to a difference between the calculated amount of residue of the crop protection product and the target maximum amount of residue for the crop protection product being greater than a defined difference:

automatically identify an alternate crop protection product for the crop plant;

calculate an amount of a residue of the alternate crop protection product in and/or on parts of the crop plant intended for human and/or animal consumption at the harvesting time of the crop plant; and generate an updated second interface for display at the computer, the updated second interface displaying the amount of residue of the alternate crop protection product relative to a target maximum amount of residue for the alternate crop protection product.

12. The system of claim 11, wherein the first computer system is configured to receive and/or ascertain said further input information and to transmit said further input information via the network to the second computer system.

13. A computer program product comprising a non-transitory data carrier and program code which is stored on the data carrier and which triggers a computer system, in memory of which the program code has been loaded, to execute the following steps:

generating a first interface for display at a computer that displays one or more interactive menus that allows user selection of at least a type of crop plant, wherein the interface includes a virtual map element to allow a user clicking on the virtual map element by means of finger movements to enlarge a size of a detail of the virtual map element or reduce the size of the detail of the virtual map element;

receiving and/or transmitting the following input information:

a field location received via a selection at the virtual map element of the first interface;

a crop plant being grown at the field location received and/or ascertained by selection of the crop plant at the one or more interactive menus of the first interface;

a crop protection product used;

a number of applications of the crop protection product and amounts applied each time;

periods of time between the application(s) and harvesting time;

information relating to biomass of the crop plant that was present on each application of the crop protection product; and environmental conditions during growing of the crop plant, especially on and/or after the application(s) of the crop protection product;

calculating an amount of a residue of the crop protection product in and/or on parts of the crop plant intended for human and/or animal consumption, preferably at the time of harvesting of the crop plant, using the input information;

wherein the amount of residue is calculated on the basis of a mathematical function relationship, preferably based on an exponential function, wherein the mathematical function relationship describes degradation of the crop protection product as a function of time, wherein the mathematical function relationship has at least one parameter, wherein the at least one parameter is calculated with the aid of a machine learning model on the basis of one or more of the input information;

generating a second interface for display at the computer, the second interface displaying the calculated amount of residue and a target maximum residue level for the crop protection product; and in response to a difference between the calculated amount of residue of the crop protection product and the target maximum amount of residue for the crop protection product being greater than a defined difference:

automatically identifying an alternate crop protection product for the crop plant;

calculating an amount of a residue of the alternate crop protection product in and/or on parts of the crop plant intended for human and/or animal consumption at the harvesting time of the crop plant; and generating an updated second interface for display at the computer, the updated second interface displaying the amount of residue of the alternate crop protection product relative to a target maximum amount of residue for the alternate crop protection product.

14. The computer program product as claimed in claim 13, wherein the machine learning model has been trained in a monitored learning method using training data to learn a correlation between the one or more of the input information, preferably represented by a feature vector, and the at least one parameter of the mathematical function relationship.

* * * * *